United States Patent [19]

Grilli et al.

[11] 4,365,848
[45] Dec. 28, 1982

[54] CONNECTION LINK FOR ENDLESS CHAINS OF TRACKED EQUIPMENT

[75] Inventors: Walter Grilli, Modena; Aldo Crotti; Giuseppe Barchetti, both of Castelnuovo, all of Italy

[73] Assignee: Italtractor I.T.M. S.p.A., Castelvetro, Italy

[21] Appl. No.: 154,100

[22] Filed: May 28, 1980

[30] Foreign Application Priority Data

Jul. 9, 1979 [IT] Italy ............................. 28976/79[U]

[51] Int. Cl.$^3$ ............................................. B62D 55/28
[52] U.S. Cl. ............................... 305/54; 305/58 R
[58] Field of Search .......................... 305/39, 54, 58 R

[56] References Cited

U.S. PATENT DOCUMENTS

| | | |
|---|---|---|
| 1,262,179 | 4/1918 | Daniel . |
| 1,980,126 | 11/1934 | Williams . |
| 2,318,683 | 5/1943 | Galanot et al. |
| 2,882,102 | 4/1959 | Rund . |
| 3,020,096 | 2/1962 | Strnad . |
| 3,096,661 | 7/1963 | Reinsma et al. |
| 3,357,750 | 12/1967 | Reynolds et al. |
| 3,427,079 | 2/1969 | Skromme et al. |
| 3,822,923 | 7/1974 | Stedman . |
| 4,050,750 | 9/1977 | Yoshihashi et al. |

FOREIGN PATENT DOCUMENTS

| | | |
|---|---|---|
| 1170726 | 5/1964 | Fed. Rep. of Germany . |
| 2038144 | 2/1972 | Fed. Rep. of Germany .... 305/58 R |
| 2844107 | 4/1979 | Fed. Rep. of Germany .... 305/58 R |
| 1193647 | 6/1970 | United Kingdom . |

*Primary Examiner*—F. J. Bartuska
*Attorney, Agent, or Firm*—Browdy and Neimark

[57] ABSTRACT

A connection link for endless track chains is composed of two mutually complementary link portions divided by a separating surface following a broken-line development. Each of the link portions comprises one of the seats for the pins and bushings effecting the mutual link connection. Each of the link portions comprises a tooth and a space arranged in such a way that the tooth of one portion is contained in the space of the other portion. The contact between the two link portions occurs between the sides of the teeth and of the spaces and not on the bottom land (12) of the spaces. Moreover, the faying or closely contacting surface (8) between the internal sides of the teeth and the respective spaces is sloped so as to form obtuse angles with the bottom lands (12) of the spaces, and in order to be more or less perpendicular to the tractive force exerted on the first portion of the link when the link is placed on the track-stretching wheel.

19 Claims, 9 Drawing Figures

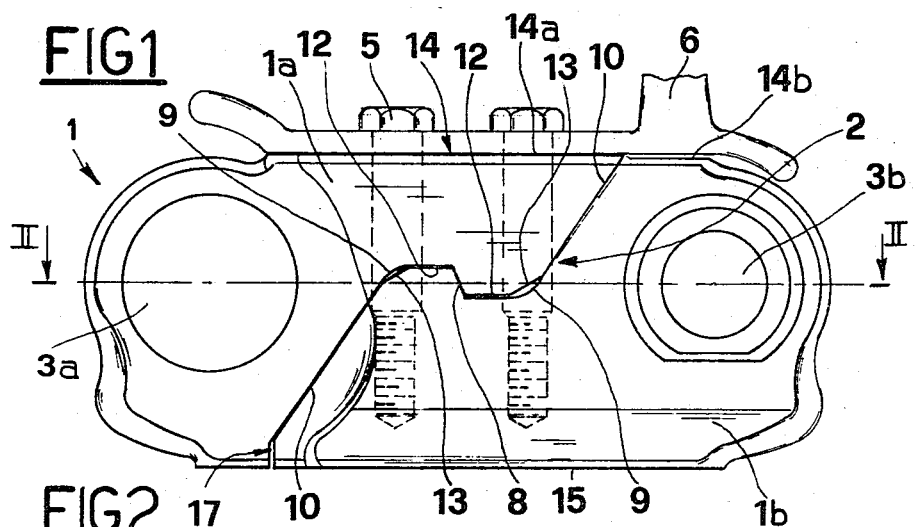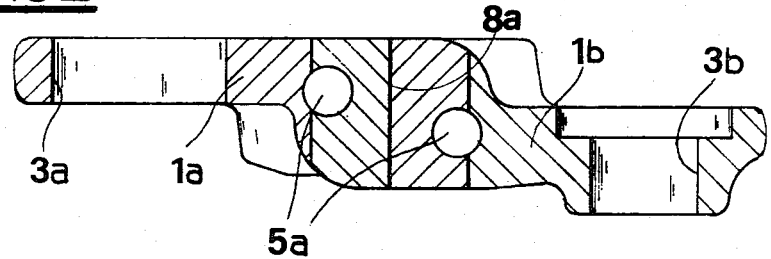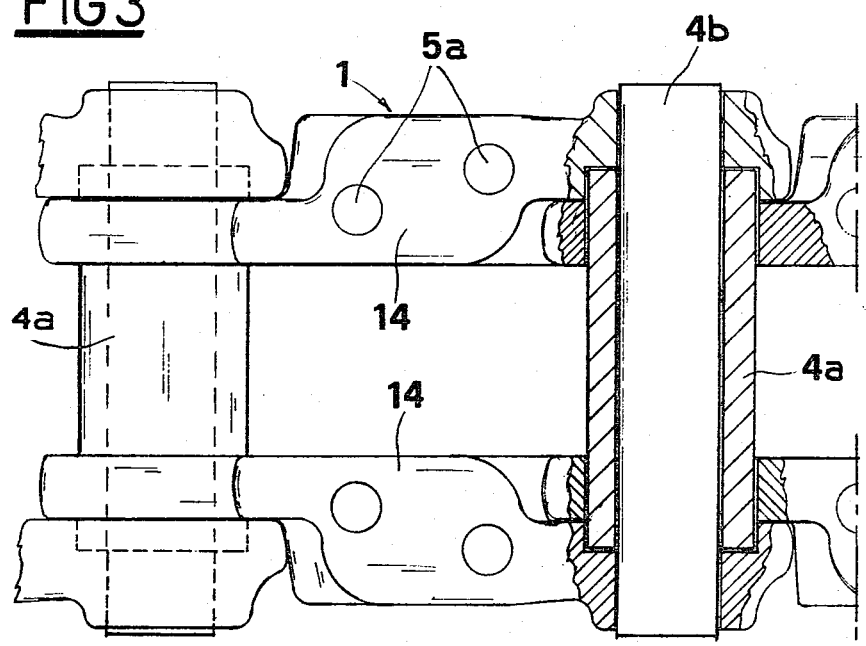

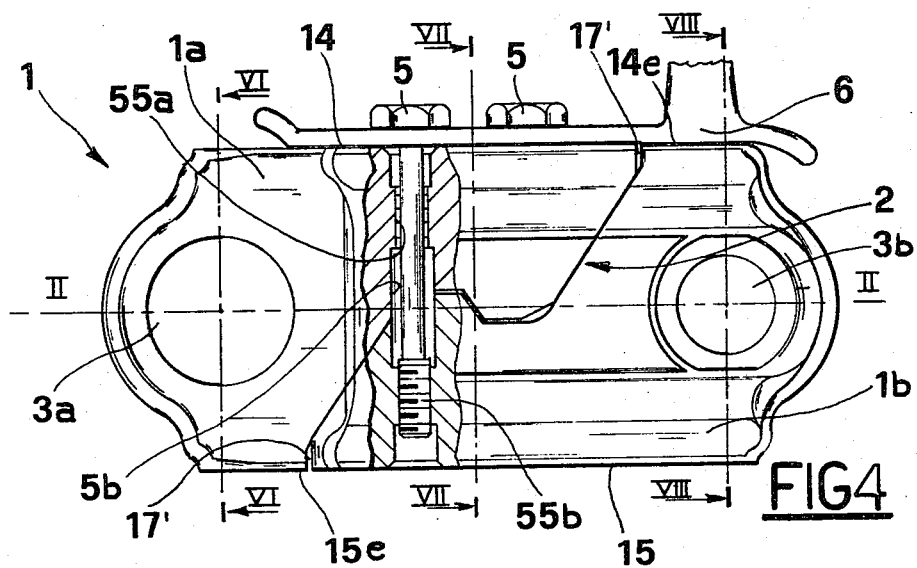
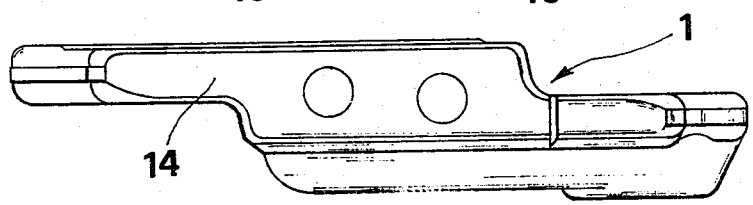
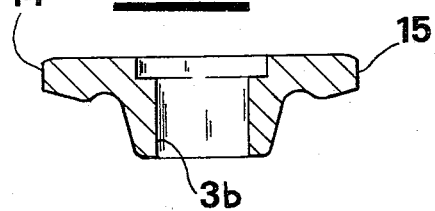
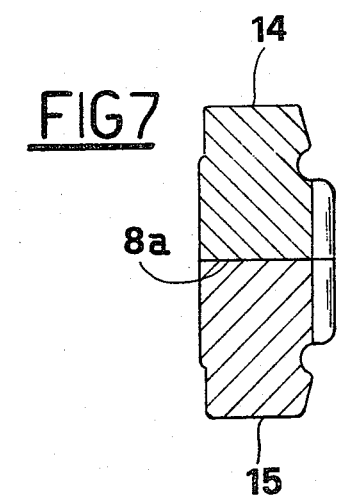
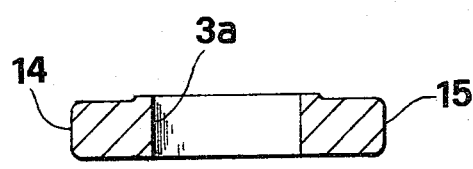

CONNECTION LINK FOR ENDLESS CHAINS OF TRACKED EQUIPMENT

This invention refers to an endless chain connection link for tracked equipment.

In tracked equipment, each chain includes a number of mutually connected links by means of pins and bushings so as to compose a ring-like closed unit (chain).

The chains are generally connected in pairs, and the track shoes are fixed onto the links, on the upper surface of said chains. The bottom surface of the chain rolls on special races. Each chain must be provided with suitable connecting devices—which may be removed easily by means of hand-operated tools—both in order to lock the chain on the track unit at the time of assembly, and in order to open the chain and carry out any necessary repairs on the chain and on the machine.

In this perspective, there are some presently known connection links which comprise first and second mutually complementary link portions, which are jointed to each other so as to make up a whole link. These link portions are separated from each other by a parting line which runs more or less diagonally from the top surface of the link, where the shoe is screwed on, to the bottom surface (opposite the top surface), and are connected to each other by means of connection pins or bolts or by a combination of such components.

The object of this invention is to supply a connection link of the type described, in which the surfaces of the first and second link portions coming into contact along the aforementioned parting line, are shaped and proportioned in a particular way, so as to withstand effectively the various strains exerted on the connection link and to allow for quick and easy assembly and disassembly of the connection link.

Another object of this invention is to supply a connection link which may be utilized both as a right and as a left link, thus entailing considerable advantages from the point of view of construction and stocking, lower costs in regard to equipment and less machine shop rejection, hence making it possible to reutilize the links when the bottom surface rolling on the race is worn.

A further object of this invention is to supply a highly reliable link which is also easy to manufacture.

The above and other objects still are all achieved by the link under discussion, of the type comprising:

first and second mutually complementary link portions, separated by a parting line, developing according to a broken line and to parallel horizontal generating lines, along a portion of which parting line the two link portions are in contact, each of the above presenting a tooth and a space arranged in such a way that the tooth of one portion is contained in the space of the other portion;

characterized by the fact that: the contact between said link portions occurs only on the sides of the teeth and of their respective spaces; the contact between the two internal sides of the teeth is effected along a contact surface which intersects the longitudinal median plane containing the axes of the pin and bushing seats of such surface, along a straight line which is approximately equidistant from the above axes, and is arranged symmetrically in respect of said straight line and is inclined relative to the vertical in an anticlock-wise direction, so as to be more or less perpendicular to the tractive force exerted on the first portion of the link when the link itself is placed on the track-stretching wheel.

Some further features and advantages of the invention will appear more clearly in the detailed description, given hereunder, of a preferred but by no means exclusive embodiment of the connection link under discussion, which is supplied purely by way of example and is in no way restrictive upon the invention itself, reference being had to the enclosed drawings where:

FIG. 1 is a vertical elevation of a first embodiment of the link under discussion with its shoe, FIG. 2 is a sectional view of the link of FIG. 1 taken on line II—II;

FIG. 3 is a top view of a portion of two coupled chains comprising two of the links under discussion, the shoe being removed and with a cutaway of some parts;

FIG. 4 is a vertical view of a second embodiment of the link under discussion, connected to its shoe, with a cutaway of some parts;

FIG. 5 is a top view of the link, according to the embodiment shown in FIG. 4, the shoe being removed;

Figure 9:
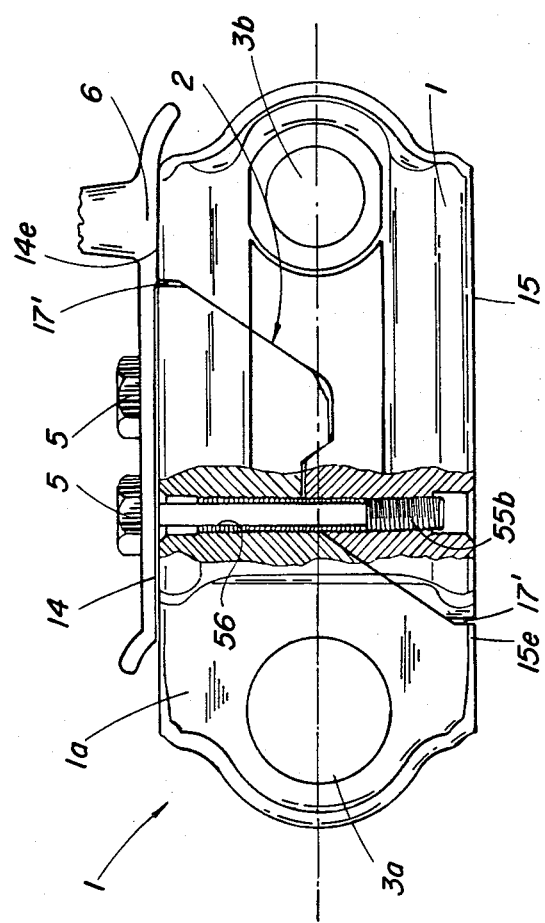

FIGS. 6-7-8 respectively, are cross sections taken on lines VI—VI, VII—VII and VIII—VIII of FIG. 4 and FIG. 9 is a view similar to FIG. 4 showing a variation of one future.

With reference to the aforementioned figures, a connection link (1) comprises a first portion (1a) ad a second portion (1b) making up the link, separated from each other by a parting line (2) made up of a broken line and parallel horizontal generating lines. These two portions (1a) and (1b) are mutually complementary and shaped in such a way as to form a whole link, once they are joined to each other.

The joining of the two link portions is obtained by means of screws (5), designed to secure a shoe (6) to link (1), which screws are screwed into blind holes (5a) arranged according to vertical axes parallel to each other.

The holes (5a) are located in the central area of the link and their length is such that they run through both link portions; these holes are threaded only on the part relating to the second link portion (1b).

Each portion of the link (1a) and (1b) contains entirely one horizontal-axis seats designed to connect the chain links by means of pins and bushings: portion (1a) includes seat (3a) in which the link is connected integrally by means of a bushing (4a), while portion (1b) includes the seat (3b) in which the link is jointed integrally by means of a pin (4b).

During the chain assembly operations, the pin connected to a link is fitted into the bushing of the following link and may rotate within the bushing itself thus articulating the chain links. The common procedure to obtain a couple of chains is to place the links next to one another on bushings and pins symmetrically, hence each pair of chains requires two connection links, right and left respectively, one for each side, which are to be symmetrical in shape to each other (FIG. 3). Each link portion is endowed with a tooth and a space arranged in such a way that when the portions are connected to each other, the tooth of one portion is contained in the space of the other portion, and vice-versa. The contact between the two above link portions occurs—along the parting line (2)—between the sides (10) and (8) of the teeth and those of their respective spaces, while the top land (12) of the teeth and the bottom land of their respective spaces are not in contact. In particular, the contact between the internal sides of the teeth occurs along a contact surface (8) which intersects the median longitudinal plane containing the axes of seats (3a) and (3b), marked in FIG. 1 by line II—II, along a straight line (8a) which is coaxially equidistant from the axes of the two seats. The straight line (8a) is basically equidistant also from the axes of holes (5a). Surface (8) is set symmetrically in relation to plane II—II and is inclined so as to form obtuse angles with the bottom lands of the spaces (12) and in order to be approximately perpendicular to the tractive force, the direction of which is known, exerted on portion (1a) of the link when said link is placed on the track-stretching wheel.

This arrangement makes it possible to prevent the occurrence of excessive strain on screws (5), both when the link is placed on the track-stretching wheel and when the link is on the horizontal branches of the chain, because the slant of surface (8) is not such to produce strong components acting vertically in respect of the tractive force nor strong bending moments.

Moreover, the fact that surface (8) is symmetrical to plane II—II prevents the occurrence of bending moments when the link is placed on the horizontal branches.

Link (1) has a considerable transverse width at its center (which may be seen in FIG. 2) and the height of its teeth is reduced so that surface (8) is characterized by a small length/transverse width ratio, at any rate smaller than other links of the same type. The reduced height of the tooth entails greater resistance of the tooth itself in respect of bending stress, while the increase in the transverse width of the link amounts to an increase in area of surface (8) and, therefore, a reduced superficial specific pressure in the area of contact. The reduced height of the teeth, hence the limited depth of the spaces, confers even greater resistance upon link portions (1a) and (1b) in regard to the sections corresponding to the bottom land of the aforementioned spaces.

Each space is endowed—in the part opposite surface (8)—with an arc (9), the radius of which is substantially equal to the depth of the space, starting approximately from the intersection of the side (10) of the space with median plane II—II and reaching as far as the bottom land (12) of the space.

Each tooth presents—in the art corresponding to the tooth fillet (9) of the respective space—a flat bevel (13), which is about as long as the chord of the arc (9), which extends for the whole transverse width of the tooth. The above device makes it possible to prevent the concentration of dangerous strains leading to fracture initiations.

The parting line (2) must intersect the top (14) and bottom (15) surfaces of the link as close to their ends as possible, right and left ends respectively; this requirement must be fulfilled in a manner which is compatible with the requirement not to reduce the distance between the parting line (2) and seats (3b) and (3a) too much, in order not to weaken the corresponding section too much.

More in detail, in a first embodiment shown in FIGS. 1 and 2, the top surface (14) is sub-divided into a part (14a) belonging to the link portion (1a) and a part (14b) belonging to link portion (1b): part (14b) is made in such a way as not to be at a greater height than part (14a), so that shoe (6) is supplied with a safe rest on part (14a), the extension of which is far larger than that of part (14b). On the bottom surface (15), the parting line ends with line sections (17) which are more or less perpendicular to surface (15): this prevents the occurrence of pointed areas which might prove dangerous in view of brittle fractures, since surface (15), which rolls on guides, is hardened considerably. Also, link portions (1a) and (1b) are not in contact with each other along line sections (17) in order to allow the sides of the teeth and of the spaces to make contact suitably. The length of lines (17) are such that they remain in a substantially perpendicular relationship to surface (15) even when the latter has reached its maximum level of wear.

A second embodiment of the link under discussion is shown in FIGS. 4 to 8. Such link—in which the same numbers have been used to mark the components corresponding to the first embodiment—exhibits, basically, the same features described when speaking about the aforementioned link, the only difference being provided by the fact that this link is symmetrical about median longitudinal plane II—II; such peculiarity can be noted clearly by looking at FIGS. 6-7-8 in which such symmetry is evident. In particular, the top (14) and bottom (15) surfaces are equal.

Unlike the link structured according to the first embodiment, the parting line (2) ends on both surfaces (14) and (15) with sections (17) having an approximately perpendicular orientation to said surfaces, in accordance with the features described above. It is worth noting that in this case parts (14e) of top surface (14), and (15e) of bottom surface (15), are set at a level which does not exceed the remaining parts of surfaces (14) and (15) respectively, a point which was true for part (14b) of surface (14), described previously.

The advantages afforded by the symmetrical link are considerable: in the forming stage, in fact, one no longer requires separate dies for the portions of the right link and portions of the left link, hence the number of dies is halved. Also, this favours the solutions of all those problems connected to the stocks held in store, to scrap material, etc.

Moreover, when the bottom surfaces of the links, which roll on guides, are worn as a result of long periods of operation, it is possible to exchange said links with each other putting the right link on the left side and vice-versa, so that those which were previously the top surfaces (14)—hence not worn because they were protected by shoe (6)—become bottom surfaces (15). In such case, both surfaces (14) and (15) must be treated for surface hardening.

The symmetrical link may be endowed with blind holes (5a), for screws (5), of the type described above. In this case, once the machining is accomplished, the link is no longer symmetrical and it is no longer possible to exchange the right and left links, although the advantages obtained in the manufacturing stage of the links remain considerable.

FIG. 4, on the other hand, shows two through holes (5b) arranged according to vertical and mutually parallel axes. Each of those through holes is equipped with two threaded areas (55a) and (55b), area (55a) being located in the first portion (1a) and area (55b) in the second portion (1b) respectively. The unthreaded areas of the holes have a greater diameter than the outside diameter of the threaded holes. In this case, one must use special bolts, the unthreaded part of which has a smaller diameter than the root diameter of the threaded part. It is also possible to thread holes (5b) entirely. This variation is shown in FIG. 9, note the through threaded hole 56. In both cases, holes (5b) can be countersunk as shown at the surfaces (14) and (15) so as to make up for the material wear of either surface (14) or (15) on the side of the race, and in order to prevent any reductions in the diameter of the hole as a result of possible strains on behalf of the material on the countersunk orifice of the hole. These last two solutions also preserve the symmetrical structure of the link also at the manufacturing stage and allow therefore the link exchange as described above.

Naturally, numerous applicational alterations of the structural details may be made within the teaching herein, without, however, exceeding the boundaries of the underlying invention itself as claimed hereunder.

We claim:

1. An endless chain connection link for tracked equipment, of the type comprising first and second mutually complementary link portions, each of said link portions including a bushing seat adapted to connect a plurality of said links together into a chain, said link portions of said connection link being separated by a parting line along only part of which the two link portions are in contact, each of said link portions comprising a single tooth and a single space arranged thereon in such a way that the tooth of one portion is contained in the space of the other portion in the assembled together condition of said link portions, said connection link comprising a shoe and screw means, the two link portions being connected to each other by said screw means which also secure said shoe to the connection link, characterized in that: said link has a median longitudinal plane containing the axes of said seats, each link portion tooth being defined by a pair of side surfaces (10) and (8) and a land (12) therebetween, the contact between said link portions occuring only on said side surfaces (10) and (8) of the tooth, the contact between the two side surfaces (8) of the teeth occuring along a common contact surface which intersects said median longitudinal plane; and said common contacting surface defining a straight line which is approximately equidistant from the axes of said seats, which is symmetrical relative to said median plane, which is at an angle with respect to said median plane so as to form obtuse angles with said lands (12) and which is approximately perpendicular to the tractive force exerted on said link portions when the assembled link is placed in use in a chain on a piece of tracked equipment.

2. A link according to claim 1, further characterized in that said common contact surface comprises a relatively small length to transverse width ratio.

3. A link according to claim 1, further characterized in that said link has a top surface (14), said parting line dividing said top surface (14) of the link into two parts, one part (14b) of which is part of said second link portion (1b) and is at a height which does not exceed the height of the part of said top surface on said first link portion (1a).

4. A link according to claim 1, further characterized in that said link has a lower surface (15), the ends of said parting line at said lower surface (15) of the link comprising a predetermined length (17—17') disposed approximately perpendicular to said lower surface (15), the parts of the first and second link portions corresponding to said perpendicular lengths being out of contact with each other in the assembled condition of said link.

5. A master track link for crawler tracks comprising first and second matching link portions each of which wholly defines a seat for accommodating means to connect a plurality of said links into said track, each of said link portions comprising a single tooth and a single space disposed such that the tooth of one portion fits into the space of the other portion; said teeth and therefore said spaces being substantially identical to each other respectively; said link comprising a median longitudinal plane containing the axes of said seats, said teeth extending across said plane in the assembled condition of said link, each tooth comprising side surfaces which are inclined such that the top of each tooth is smaller than the base of said tooth both measured in planes parallel to said median plane, contact between said two link portions in the assembled link occurring solely at said side surfaces of said teeth and the corresponding surfaces of said spaces with no contact between the tops of said teeth and the bottoms of said spaces, respectively; and wherein the contacting surfaces of said teeth are at an angle to said median plane and are load bearing.

6. The link of claim 5, wherein the facing side surfaces of the two teeth of said first and second link portions which contact each other in the assembled together condition of said link define a common contact surface, and said common contact surface being positioned substantially equi-distant from the axes of said two seats in said median plane.

7. The link of claim 5, wherein the side surfaces of the two teeth of said first and second link portions which contact each other in the assembled together condition of said link define a common contact surface, said common contact surface crossing said median plane, and said median plane dividing said common contact surface into two substantially equal parts one on either side of said median plane.

8. The combination of claim 5, wherein the side surfaces of the two teeth of said first and second link portions which contact each other in the assembled together condition of said link define a common contact surface, said common contact surface being located in said link such that it is approximately perpendicular to the working force on said endless crawler track when said track passes around a drive wheel member which drives such track.

9. The link of claim 5, wherein the side surfaces of the two teeth of said first and second link portions which contact each other in the assembled condition of said link define a common contact surface, and said common contact comprising a relatively small length to transverse width ratio.

10. A link according to claim 5, further characterized in in that said link has a top surface (14),
    said link being divided into two portions by a parting line, said parting line dividing said top surface (14) of the link into two parts, one part (14b) of which is part of said second link portion (1b) and is at a height which does not exceed the height of the part of said top surface on said first link portion (1a).

11. A link according to claim 5, further characterized in that said link has a lower surface (15),
    said link being divided into two portions by a parting line, the ends of said parting line at said lower surface (15), of the link comprising a predetermined length (17-17') disposed approximately perpendicular to said lower surface (15), the parts of the first and second link portions corresponding to said perpendicular lengths being out of contact with each other in the assembled condition of said link.

12. A link according to claim 5, further characterized in that said link is formed with a pair of through holes (5b) arranged on parallel axes generally perpendicular to said median plane, each of said holes comprising two threaded areas each located in one of said link portions, and the unthreaded areas (55a) and (55b) of said holes having a greater diameter than the maximum diameter of said threaded areas.

13. A link according to claim 5, further characterized in that said link is formed with a pair of through holes arranged on mutually parallel axes generally perpendicular to said median plane, and each of said holes being threaded over substantially its entire length.

14. A link according to claim 5, further characterized in that said link is formed with a pair of through holes arranged on mutually parallel axes generally perpendicular to said median plane, said link comprising top and bottom surfaces and said through holes being countersunk inwardly from said top and bottom surfaces.

15. A link according to claim 1 or 5 further characterized in that:
each of said spaces includes a tooth fillet arc (9) at the junction of the side surface (10) opposite said common contact surface and said land, the radius of said arc being approximately equal to the depth of the space starting from the intersection of said side (10) opposite common contact surface with said median plane to said bottom land (12) and each of said teeth comprising, at a location corresponding to the tooth fillet (9) of the mating space in the companion, link portion, a flat bevel (13) the length of which is approximately equal to the chord length of said tooth fillet arc (9).

16. A link according to claim 1 or 3, further characterized in that the assembled link is symmetrical with respect to said median longitudinal plane.

17. A link according to claim 1 or 16, further characterized in that said link if formed with a pair of through holes (5b) arranged on parallel axes generally perpendicular to said median plane, each of said holes comprising two threaded areas each located in one of said link portions, and the unthreaded areas (55a) and (55b) of said holes having a greater diameter than the maximum diameter of said threaded areas.

18. A link according to claim 1 or 16, further characterized in that said link is formed with a pair of through holes arranged on mutually parallel axes generally perpendicular to said median plane, and each of said holes being threaded over substantially its entire length.

19. A link according to claim 1 or 16, further characterized in that said link is formed with a pair of through holes arranged on mutually parallel axes generally perpendicular to said median plane, said link comprising top and bottom surfaces and said through holes being countersunk inwardly from said top and bottom surfaces.

* * * * *